(12) United States Patent
Visalli et al.

(10) Patent No.: US 8,250,300 B2
(45) Date of Patent: Aug. 21, 2012

(54) CACHE MEMORY SYSTEM AND METHOD WITH IMPROVED MAPPING FLEXIBILITY

(75) Inventors: Giuseppe Visalli, Messina (IT); Francesco Pappalardo, Paterno' (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 248 days.

(21) Appl. No.: 11/415,880

(22) Filed: May 1, 2006

(65) Prior Publication Data

US 2006/0271723 A1 Nov. 30, 2006

(30) Foreign Application Priority Data

Apr. 29, 2005 (EP) .................................. 05103593

(51) Int. Cl.
*G06F 12/00* (2006.01)
(52) U.S. Cl. ........ 711/118; 711/129; 711/128; 711/168; 711/150
(58) Field of Classification Search .................. 711/118, 711/129, 128, 168, 150
See application file for complete search history.

(56) References Cited

U.S. PATENT DOCUMENTS

| | | | | | |
|---|---|---|---|---|---|
| 4,953,073 | A | * | 8/1990 | Moussouris et al. | 711/3 |
| 5,509,137 | A | * | 4/1996 | Itomitsu et al. | 711/168 |
| 5,710,905 | A | * | 1/1998 | Wan | 711/118 |
| 5,812,815 | A | * | 9/1998 | Yazdy | 711/140 |
| 5,857,214 | A | * | 1/1999 | Dey | 711/212 |
| 6,192,458 | B1 | * | 2/2001 | Arimilli et al. | 711/220 |
| 6,243,795 | B1 | * | 6/2001 | Yang et al. | 711/159 |
| 6,516,386 | B1 | * | 2/2003 | Pang et al. | 711/118 |
| 6,832,294 | B2 | * | 12/2004 | Wicki et al. | 711/128 |
| 6,854,033 | B2 | * | 2/2005 | Solomon et al. | 711/3 |
| 7,143,239 | B2 | * | 11/2006 | DeLan | 711/128 |
| 7,162,584 | B2 | * | 1/2007 | Adl-Tabatabai et al. | 711/118 |
| 7,243,191 | B2 | * | 7/2007 | Ying et al. | 711/118 |
| 7,437,513 | B2 | * | 10/2008 | Saida et al. | 711/128 |
| 2003/0154345 | A1 | * | 8/2003 | Lyon | 711/122 |
| 2004/0024821 | A1 | * | 2/2004 | Hady | 709/206 |

(Continued)

FOREIGN PATENT DOCUMENTS

EP 0 431 463 A 6/1991

(Continued)

OTHER PUBLICATIONS

"CPU Cache" Jan. 31, 2006. Retrieved from http://en.wikipedia.org/wiki/CPU_cache as archived by www.archive.org on Feb. 2, 2006.*

(Continued)

*Primary Examiner* — Hong Kim
(74) *Attorney, Agent, or Firm* — Graybeal Jackson LLP

(57) ABSTRACT

A cache memory system comprises a cache memory and a cache controller that receives a first address to access the cache memory. The cache controller includes a first address transformer receives the first address and to transform it into one first cache address; the first cache address is used for accessing the cache memory to retrieve a first part of a tag address portion. The cache controller includes a hit detector establishes an partial hit condition based on a comparison of the retrieved a first part of the tag address portion and a first predetermined part of the first address, and a second address transformer receives the first address and to transform it into one second cache address. The cache controller uses the one second cache address for accessing the cache memory to retrieve a data word in case the partial hit condition is established.

17 Claims, 6 Drawing Sheets

U.S. PATENT DOCUMENTS

2004/0078508 A1* 4/2004 Rivard ............................ 711/4
2004/0117558 A1* 6/2004 Krick et al. ................. 711/141

FOREIGN PATENT DOCUMENTS

EP          841619 A2 *  5/1998
EP        1 291 776 A    3/2003
WO       WO 00/45267 A   8/2000

OTHER PUBLICATIONS

Article "Translation Look-Aside Buffer-Unified Cache Memory", published in IBM Technical Disclosure Bulletin, vol. 37, No. 7, Jul. 1, 1994, pp. 275-276.

Article: "Microprocessor Memory Management Units" by M. Milenkovic, published in IEEE Micro, vol. 10, No. 2, Apr. 1, 1990, pp. 70-85.

* cited by examiner

CACHE MEMORY SYSTEM AND METHOD WITH IMPROVED MAPPING FLEXIBILITY

PRIORITY CLAIM

This application claims priority from European Patent Application No. EPO5103593.9, filed 29 Apr. 2005 and published as EP1717708 on 2 Nov. 2006, which is incorporated herein by reference.

TECHNICAL FIELD

An embodiment of the present invention relates to the memory field. More particularly, an embodiment of the present invention relates to cache memory systems.

BACKGROUND

Data processors, like microprocessors used in personal computers, rely for the execution of the intended programs on working memories ("main memories") typically constituted by banks of Dynamic RAMs (DRAMs).

Modern data processors, however, operate at speeds which exceed the usual DRAM access times. To overcome such problems, and allow the processor to run near its clock speed, cache memory systems including cache memories are used.

A cache memory (hereinafter also referred to as "cache", for brevity) is a relatively small, but fast memory (typically, a Static RAM-SRAM), which stores (or "caches") copies of the data content of the most frequently, or more recently accessed main memory locations. As long as most memory accesses are made to cached main memory locations, instead of to the main memory itself, the average latency of memory accesses is closer to the cache latency than to the latency of the main memory.

A typical cache memory system comprises two different memory components. A first memory component, referred to as "data cache", which is usually the larger of the two, is a memory which stores the copies of the data or the instructions needed by the processor, so that such information need not be retrieved from the main memory. A second memory component, referred to as the "tag cache", is used to store portions of main memory addresses. The data cache includes a plurality of storage locations called "cache lines". Usually, the width (in terms of number of bits) of the generic cache line is larger than the width of the generic main memory location. Thus, when a generic main memory location is accessed, a corresponding group of main memory locations is actually cached into the cache memory. The term "cache lines" is also used to identify one of said groups of main memory locations. Each cache line of the data cache is associated with a corresponding location in the tag cache, which contains a "tag" The tag represents a portion of a main memory address, identifying a respective cache line in the main memory which has been cached into that cache line of the data cache.

When the processor has to read or write a main memory location, it issues a main memory address code, which identifies a cache line in the main memory. The cache memory system checks whether the addressed cache line is present in the cache. This is accomplished by comparing the part of the main memory address code identifying the addressed cache line (i.e., the tag portion of the address) to all the tags stored in the tag cache locations. If it is found that the addressed main memory cache line is in the cache, a cache "hit" is decreed. Otherwise, the cache memory system decrees a cache "miss". In the case of a cache hit, the processor immediately reads/writes the data from/into the proper cache line of the data cache. Otherwise, the main memory is accessed. In the case of a cache miss, the operations take more time, because they require the data transfer from the main memory, which is much slower than the cache memory. The higher the number of cache hits (known as the "hit rate"), the more effective the cache.

In the case of a cache miss, most caches allocate a new entry, which comprises the tag just missed and a copy of the corresponding data from the main memory. If the cache is already full, one of the existing cache entries in the data cache (and the corresponding entry in the tag cache) needs to be removed. The modality that is used to choose the cache line to be replaced is called the "replacement policy". As known in the art, one popular replacement policy (Least Recently Used, LRU) replaces the least recently used entry.

When the data stored in a cache line of the cache memory is changed in response to a write access requested by the processor, the data stored in the main memory needs to be updated. The moment in time when the updating operation is performed depends on the so-called "write policy" of the memory system. A known write policy, called "write-through", provides that every write to the cache causes an immediate write to the main memory. Alternatively, according to the so-called "write-back" policy, writes to the cache are not immediately performed as well onto the memory. The cache keeps track of which cache lines have been modified, and the data in these cache lines is written back to the main memory when that cache line has to be used for caching a different main memory cache line. For this reason, a miss in a write-back cache will often require two memory accesses to service.

A very important factor in determining the effectiveness of a cache relates to how the cache is mapped onto the main memory. Three different approaches to allocate the data in the cache according to the corresponding main memory addresses are known in the art.

The simplest approach to mapping the cache onto the main memory, called "direct mapping", calls for determining how many cache lines there are in the data cache memory, and dividing the main memory into the same number of cache lines. Therefore, when a generic one of said main memory cache lines is cached, it fills a predetermined one of said data cache lines.

Instead of establishing a rigid correspondence between cache lines of the data cache memory and main memory cache lines, it is possible to design the cache so that any cache line can store the data contents of any main memory cache line. This approach is called "fully associative mapping".

A compromise between the direct mapping and the fully associative mapping is the so-called "N-way set associative mapping". In this case, the cache is divided into sets, each set containing a number N of cache lines (each one corresponding to a "way"). Typically, N may be equal to 2, 4 or 8. The main memory address space is divided into corresponding sets, and the generic main memory cache line can be cached into any one of the N cache lines of the corresponding set (determined on the basis of the main memory address). In other words, within each cache line set the cache is associative.

Cache memory systems may be embedded in, e.g., microprocessor integrated circuits (so-called embedded processor ICs).

The power consumption of a cache memory system represents an important fraction of the overall power consumption of an embedded processor IC. Nowadays, cache memory systems are implemented providing within an IC chip different static RAM devices (SRAMs), corresponding to the tag cache and the data cache for each way. This solution, although improving hit rate and memory access times, needs the replication of all the circuits necessary for the functioning of the memory (input/output buffers, decoders, read circuits, write circuits and so on) per each SRAM, thus involving a higher waste of semiconductor area and higher power consumption. Moreover, the RAM specifically designed for high-performance cache memory systems (adapted to access data and tags in a same clock cycle) exhibit an elevated static power dissipation.

In view of the state of the art outlined in the foregoing, the Applicant has faced the general problem of how to implement a cache memory system in an efficient way, assuring low power consumptions.

SUMMARY

According to an embodiment of the present invention, a cache memory system is provided. The cache memory system comprises at least one cache memory and a cache memory controller. The at least one cache memory includes a plurality of storage locations, each one identified by a corresponding cache address and adapted to store tag address portions and data words, each data word corresponding to a respective tag address portion. The cache memory controller is adapted to receive a first address and to access the at least one cache memory based on the received first address. The cache memory controller includes a first address transformer adapted to receive the first address and to transform it into at least one first cache address corresponding thereto by applying a first transform function, the at least one first cache address being used by the cache memory controller for accessing the at least one cache memory to retrieve at least a first part of a tag address portion stored in at least one of the storage locations. The cache memory controller further includes a hit detector adapted to establish an at least partial hit condition based on a comparison of the retrieved at least a first part of the tag address portion and a first predetermined part of the first address, and a second address transformer adapted to receive the first address and to transform it into at least one second cache address corresponding thereto by applying a second transform function. The cache memory controller is adapted to use the at least one second cache address for accessing the at least one cache memory to retrieve a data word corresponding to the retrieved tag address portion in case said at least partial hit condition is established.

In this way, the cache memory system implements an asymmetric logic mapping of tag address portions and data words in the memory.

BRIEF DESCRIPTION OF THE DRAWINGS

Features and advantages of an embodiment of the present invention will be made clear by the following detailed description, provided purely by way of a non-limitative example, with reference to the attached drawings.

DETAILED DESCRIPTION

Figure 1:
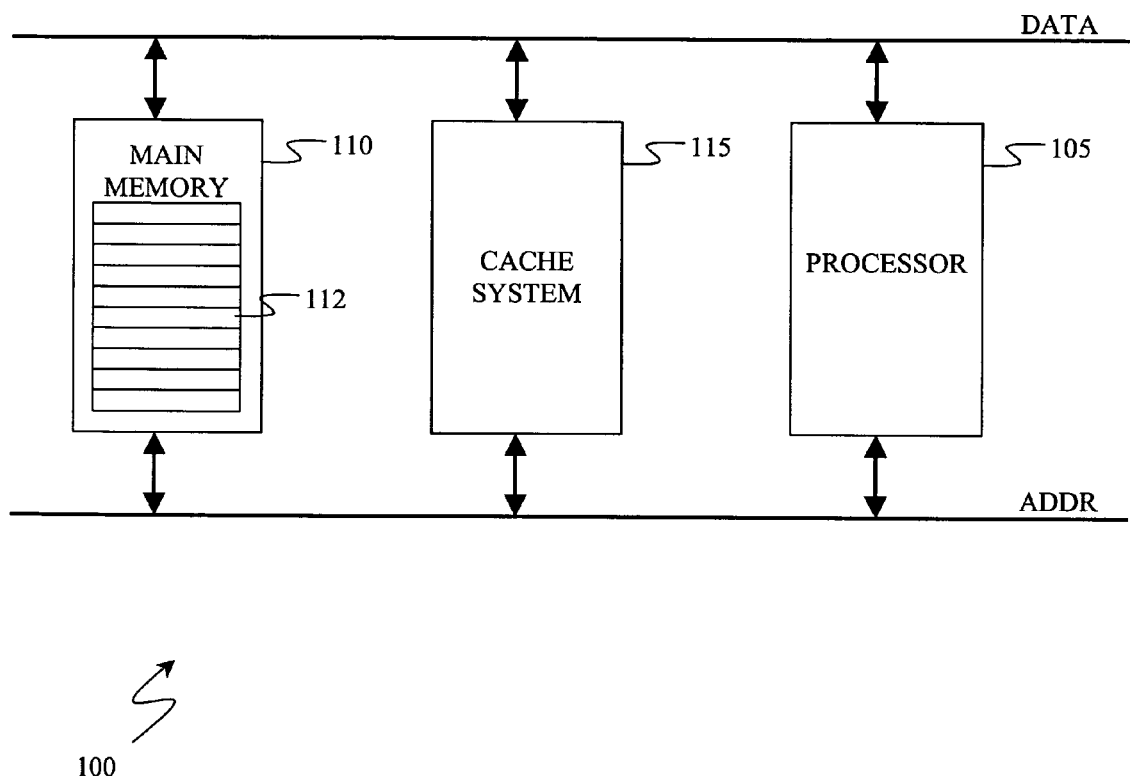
FIG. 1 schematically shows a functional block diagram of a memory system according to an embodiment of the present invention.

Referring to FIG. 1, an exemplary and schematic functional block diagram of a memory system 100 is illustrated, according to an embodiment of the present invention. More particularly, the memory system 100 includes a data processor, e.g. microprocessor 105, a main memory device 110 and a cache memory system 115, responsible of managing the exchange of data from the main memory device 110 to the microprocessor 105 and vice versa. The main memory device 110 includes a plurality of main memory storage locations 112 that can be read or written by the microprocessor 105. In FIG. 1 and in the following figures, for the sake of simplicity, signals and corresponding physical lines carrying them are denoted with the same references. The memory system 100 further includes an address bus ADDR and a data bus DATA, connecting the microprocessor 105, the main memory device 110 and the cache memory system to each other, allowing the exchange of addresses and data, respectively. The ensemble of all possible addresses ADDR defines the address space of the main memory, in the sense that each main memory location 112 corresponds to a particular address ADDR. It is important to underline that in the following description "main memory cache lines" and "main memory locations" are considered synonyms, for the sake of the description simplicity (as mentioned in the foregoing, a main memory cache line may in practice correspond to two or more main memory locations).

Figure 2:
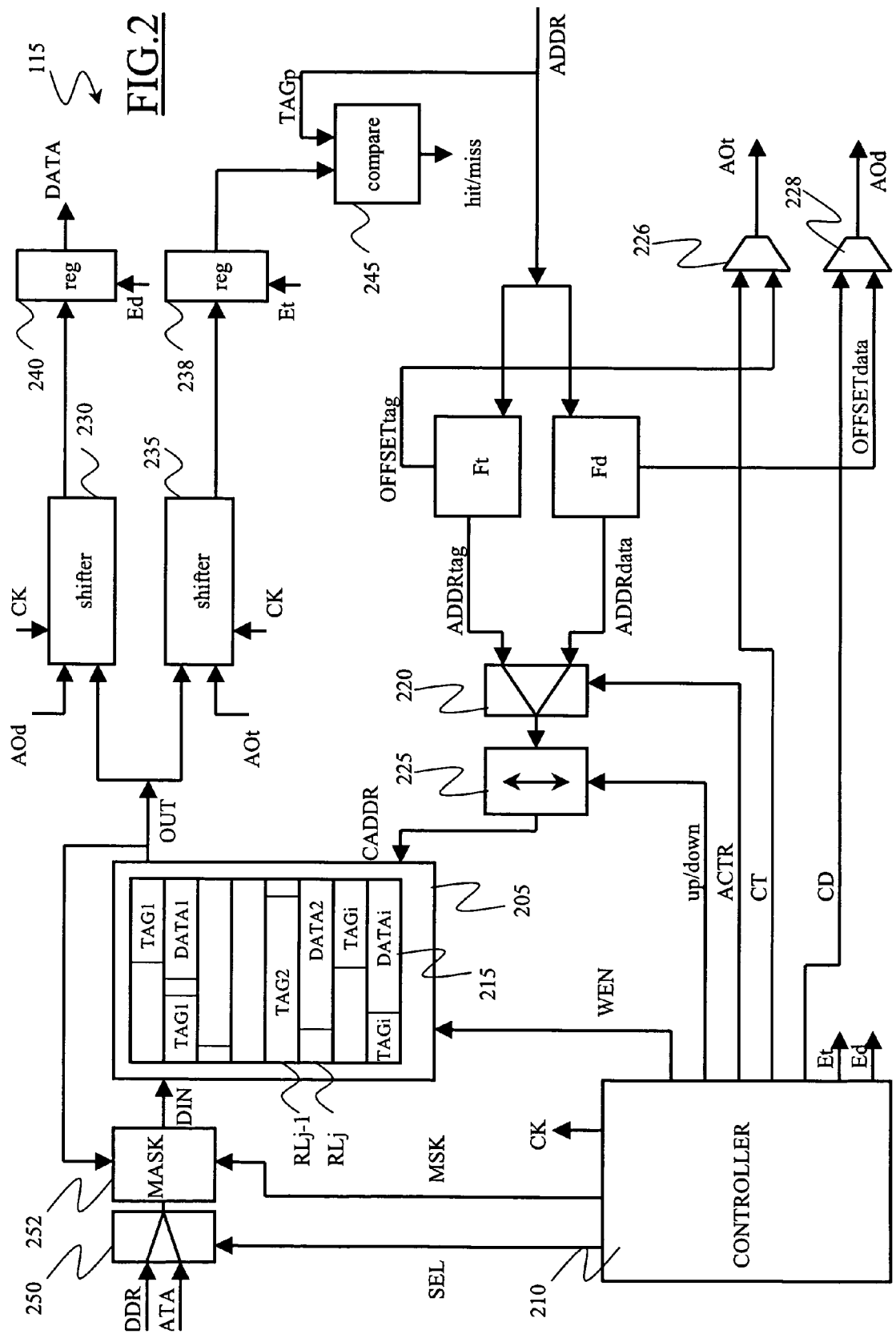
FIG. 2 schematically illustrates a functional block diagram of an exemplary cache memory system according to an embodiment of the present invention.

Referring to FIG. 2, a more detailed functional block diagram of an exemplary cache memory system 115 is illustrated, according to an embodiment of the present invention. The cache memory system 115 includes a RAM device 205 that is used as a unified tag cache and data cache memory, and is adapted to store both data and tags. The RAM device 205 may be a static RAM, having address terminals for receiving a cache address CADDR, data output terminals for providing data OUT read out from the RAM device 205 (data and/or tags), data input terminals for receiving data DIN from the main memory device 110, and a write enable terminal which receives, from a controller block 210 controlling the cache memory system, a write enable signal WEN for enabling writing operations. The RAM device 205 includes a two dimensional memory array 215 having a plurality of addressable RAM locations RLj adapted to store tag words TAG1, TAG2, ..., TAGi, and corresponding cache lines DATA1, DATA2, ..., DATAi. The ensemble of all possible cache addresses CADDR defines the address space of the cache memory, in the sense that each RAM location RLj corresponds to a particular cache address CADDR. Moreover, each cache line DATAi has (in the example herein considered) a bit width equal to the bit width of a main memory location 112. Thus, the generic cache line represents the data contained in a corresponding cached main memory location. As it can be seen in FIG. 2, a tag word TAGi and/or a cache line DATAi can be split so as to be stored into two or more different, preferably but non necessarily consecutive, RAM locations RLj. The generic tag word TAGi, and/or the generic cache line DATAi are divided into two or more chunks, each chunk being stored in a different RAM location RLj. Due to this particular arrangement, it is possible to efficiently use the storage capacity of the RAM device 205. In particular, the RAM locations RLj can be completely filled by tag and/or data irrespectively of the dimensions of tag words TAGi and cache lines DATAi without wasting memory space.

The cache memory system 115 receives an address ADDR (corresponding to a main memory location 112) that is provided to a tag mapping function block Ft and to a data mapping function block Fd. Said address ADDR is used by the tag mapping function block Ft and the data mapping function block Fd for the identification of a tag word TAGi and of a corresponding cache line DATAi in the RAM device 205. The tag mapping function block Ft is a logic block adapted to process the received address ADDR for generating a tag address ADDRtag. The tag address ADDRtag is used to generate a corresponding cache address CADDR and a tag offset value OFFSETtag. Similarly, the data mapping function block Fd is a logic block adapted to process the received address ADDR for generating a data address ADDRdata. The data address ADDRdata is used to generate a corresponding cache address CADDR and a data offset value OFFSETdata. More particularly, the tag address ADDRtag, together with the tag offset value OFFSETtag, identifies the position of a tag word TAGi within the RAM device 205, while the data address ADDRdata, together with the data offset value OFFSETdata, identifies the position of a cache line DATAi within the RAM device 205. In other words, the tag mapping function block Ft and the data mapping function block Fd (with the help of other circuital blocks that will be presented hereinafter) establish an injective correspondence between the conventional address space of the main memory and the address space of the cache memory according to a particular mapping.

The tag address ADDRtag and the data address ADDRdata are provided to two input terminals of a multiplexer 220, receiving at its control terminal an address control signal ACTR from the controller block 210. The output terminal of the multiplexer 220 is connected to the input terminal of an address value incrementer/decrementer 225 that generates and provides the cache address CADDR to the RAM device 205 as a function of an up/down control signal provided by the controller block 210. The address value incrementer/decrementer 225 is adapted to increment/decrement the address received from the multiplexer 220 (i.e., either the tag address ADDRtag or the data address ADDRdata) in case the addressed tag word TAGi or the addressed cache line DATAi are spread over two or more (possibly consecutive) RAM locations RLj, which correspond to two or more (possibly consecutive) cache addresses CADDR.

Figure 3:
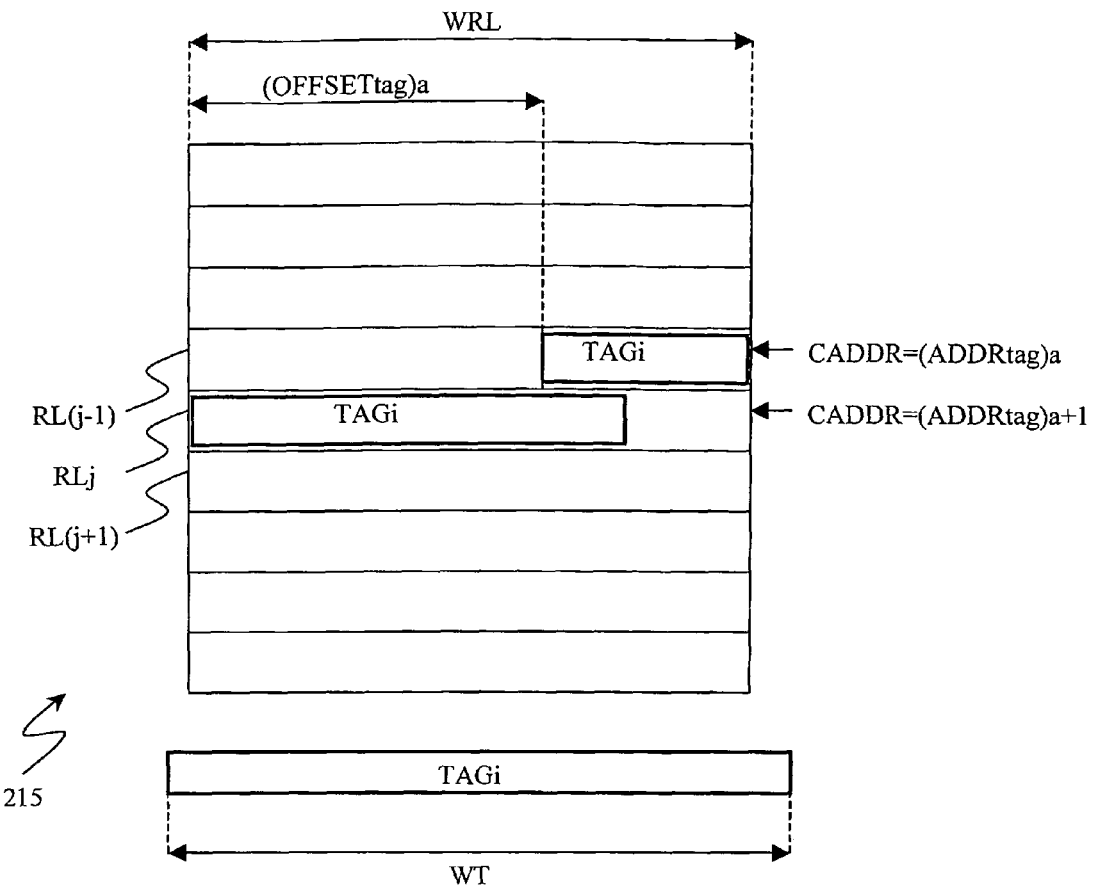
FIG. 3 illustrates an exemplary use of a single RAM memory device for storing data and tags according to an embodiment of the present invention.

Referring to FIG. 3, an exemplary use of a tag address ADDRtag and a tag offset value OFFSETtag is illustrated, according to an embodiment of the present invention. Assuming that WRL denotes a bit width of the generic RAM location RLj, and that WT denotes a bit width of the generic tag word is TAGi, a tag word TAGi is assumed to be spread over two consecutive RAM locations RL(j−1) and RLj. These two RAM locations correspond to two consecutive cache address CADDR, equal to (ADDRtag)a (address of the RAM location RL(j−1) including the first chunk of the tag word TAGi) and (ADDRtag)a+1 (address of the RAM location RL(j) including the second chunk of the tag word TAGi), respectively. Referring again to the example illustrated in FIG. 3, the first chunk of the tag word TAGi does not occupy entirely the RAM location RL(j−1), and is instead shifted with respect to the first bit of the RAM location RL(j−1) by an amount of bits which depends on the tag offset value (OFFSETtag)a. Similar considerations apply in respect of the data address ADDRdata and the data offset value OFFSETdata.

Referring back to FIG. 2, the tag offset value OFFSETtag is provided to a first input terminal of an adder block 226, which receives at a second input terminal a control tag value CT provided by the controller block 210.

The control tag value CT is added to the tag offset value OFFSETtag in order to generate an alignment offset tag value AOt necessary for aligning output words provided by the RAM device 205 in a tag retrieval operation, as will be explained in the following. Similarly, the data offset value OFFSETdata is provided to a first input terminal of an adder block 228, which receives at a second input terminal a control data value CD provided by the controller block 210. The control data value CD is added to the data offset value OFFSETdata in order to generate an alignment offset data value AOd.

When accessed in reading, the RAM device 205 provides at its output terminal an output word OUT. The output word OUT may be the contents of a RAM location RLj including a chunk of a tag word TAGi or a chunk of a cache line DATAi, depending on the operations that the cache memory system 115 is executing. Said output word OUT is supplied to respective first input terminals of two shifters 230 and 235. The shifter 230 has a second input terminal receiving the alignment offset data value AOd, and the shifter 235 has a second input terminal receiving the aligned offset tag value AOt. Moreover, the operations of the shifters 230 and 235 are synchronized by a clock signal CK (i.e., the clock signal of the memory) provided by the controller block 210.

Figure 4:
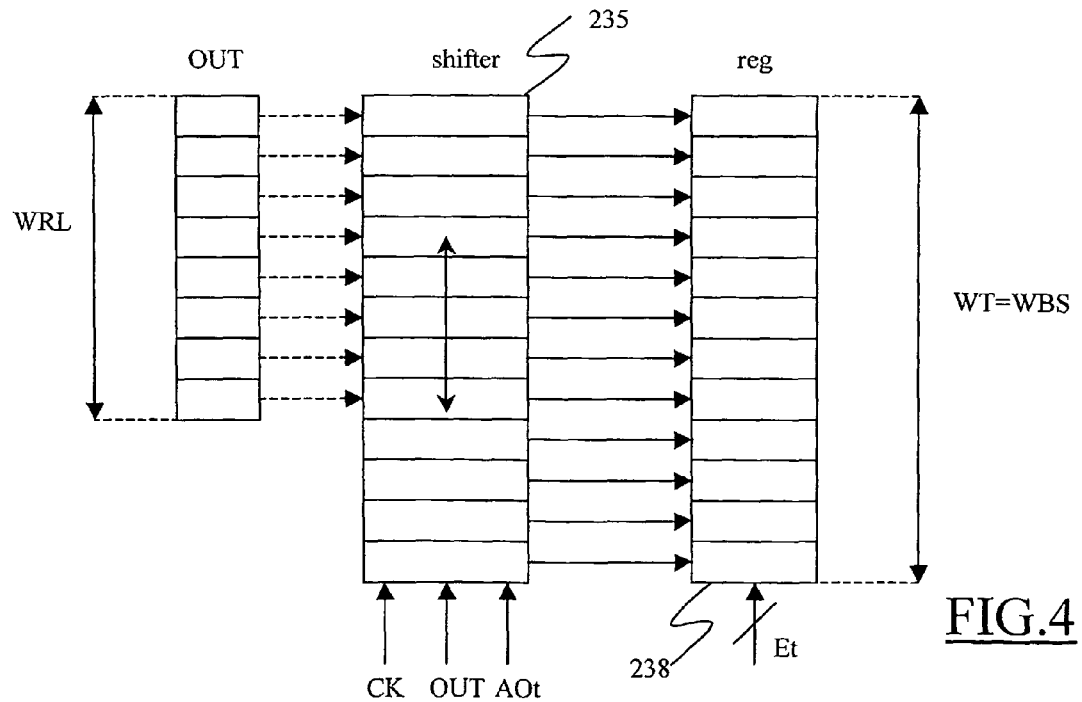
FIG. 4 schematically shows a block diagram of a shifter included in the cache memory system according to an embodiment of the present invention.

Referring now to FIG. 4, a more detailed view of an exemplary shifter (e.g., the shifter 235) is illustrated, according to an embodiment of the present invention. The shifter 235 includes a register adapted to execute shifting operations that are necessary to align the output data words OUT read from the RAM device 205 (in this case, including chunks of tag words TAGi) in such a way that it is possible to reconstruct an entire tag word TAGi by output data words OUT obtained by reading in succession two or more (possibly consecutive) locations of the RAM device 205. The shifter 235 has a bit width WBS that is equal to the bit width WT of the tag word TAGi that, in the example herein considered, is greater than the bit width WRL of the RAM location RLj. Moreover, the shifter 235 is connected to a tag register 238 having a bit width equal to the bit width WT of the tag word TAGi. Moreover, the tag register 238 is controlled by the controller block 210 by means of a tag enable bus Et having a number of lines equal to the number of bits that the tag register 238 can store. The shifter 235 is capable to align a received output data word OUT using the alignment offset tag value AOt. For example, if a tag word TAGi is stored in two consecutive RAM locations RL(j−1) and RLj, the shifter 235 first stores the first output data word OUT, then aligns it using the alignment offset tag value AOt in such a way to eliminate the offset given by the tag offset value (OFFSETtag)a, and provides the bits of the aligned first chunk of the word tag TAGi to the tag register 238 in the correct positions using an indication given by the controller block 210 by means of the tag enable bus Et. Successively, the shifter 235 stores the second output word OUT, and aligns it in such a way to provide the bits of the second chunk of the tag word TAGi to the tag register 238 adjacently to the ones of the first chunk of the tag word TAGi previously stored, so as to reconstruct the complete tag word TAGi. Similar considerations apply for the shifter 230, adapted to store and execute shifting operations to reconstruct cache lines DATAi. In this case, the shifter 230 is connected to a data register 240 having a bit width adapted to store a cache line DATAi. When the tag word TAGi has been stored and reconstructed, the tag word TAGi is transferred from the tag register to a first input of a comparator block 245. The comparator block 245 includes a second input receiving a tag portion TAGp of the address ADDR. The comparator block 245 further includes an output terminal for providing a hit/miss signal, indicating if a cache hit or a cache miss has occurred.

Input data DIN to be written into the RAM device 205 is received by means of the address bus ADDR (for tag word replacements) and the data bus DATA (for cache line replacements). The data may be received from the microprocessor 105 or the main memory 110. In particular, a multiplexer block 250 has a first input connected to the address bus ADDR, a second input connected to the data bus DATA, a control terminal receiving a selection signal SEL from the controller block 210, and an output connected to an input of a mask block 252. When a cache line DATAi has to be written into the RAM device 205, for example in the case of a cache miss (a new main memory cache line has to be cached), or in the case of a cache hit, should the microprocessor perform a write operation, the selection signal SEL is asserted by the controller block 210 in such a way to select the data bus DATA. In this way, the input data DIN to be written into the RAM device 205 is derived from the data bus DATA. Otherwise, when a tag word TAGi has to be written (which typically occurs in case of a cache miss when a new main memory cache line has to be cached), the selection signal SEL is asserted in such a way to select the address bus ADDR. In this way, the input data DIN to be written into the RAM device 205 is derived from the address bus ADDR. These writing operations are executed with the aid of the mask block 252 and of the previously described circuitry for the generation of the cache address CADR (for selecting the locations of the RAM device 205 to be written). The mask block receives a mask control signal MSK from the controller block 210, the alignment offset tag value AOt from the adder block 226, and the alignment offset data value AOD from the adder block 228. Moreover, the mask block 252 is adapted to receive a word (TAGi or DATAi) provided by the multiplexer block 250, and to perform consequently a plurality of operations (including word truncations and alignments) necessary to generate input data DIN (including chunks of tag word TAGi or cache line DATAi) that are to be stored in the RAM locations RLj. These operations require preliminary reading of the contents of the RAM locations RLj because the word alignments may imply that some bits previously stored have to be protected against overwriting. Consequently, the mask block 252 is adapted to also receive output data words OUT. For example, having to store the tag word TAG1 received entirely (in a single time) by means of the address bus ADDR into two RAM locations in the manner shown in FIG. 2, the mask block 252 provides for dividing the tag word TAG1 in two chunks, shifting them by means of the alignment offset tag value AOt and the alignment offset data value AOD, preparing two words having bit widths equal to the bit width WRL of the RAM location, and "masking" the bits that are not to be overwritten in said two RAM locations (e.g., having the first chunk of the tag word TAG1 a bit width smaller than the bit width WRL, a group of bits—in this case the first bits—must remain unchanged).

Briefly reassuming the operations performed by the cache memory system 115, when the microprocessor 105 requests the reading of the content of a main memory location 112 corresponding to an address ADDR, it provides this address to the cache memory system 115 that, in response, retrieves a corresponding tag word TAGi from the RAM device 205. The search of said tag word TAGi is performed by means of the circuital blocks Ft, 225, 210, 235, 238 and 245 described previously. If the retrieved tag word TAGi results equal to the tag portion TAGp of the current address ADDR (cache hit), it means that the content of the addressed main memory location 112 is cached in a cache line DATAi stored in the RAM device 205. The cache memory system then retrieves the desired cache line DATAi, possibly by performing one or more additional read accesses to the memory 205, so as to place the cache line DATAi into the data register 240. The cache line DATAi is then provided to the microprocessor 105. As mentioned, the method illustrated may involve more than one consecutive accesses to the RAM device 205. In fact, for the efficient exploitation of the storage capability of the RAM device 205, the generic tag word TAGi and/or the generic cache line DATAi may be divided into chunks, which are stored into different RAM locations RLj. In the case of a cache miss (retrieved tag word TAGi different from the tag portion TAGP), the data stored in the main memory cache line including the addressed main memory location 112 is cached, and the tag portion TAGp of the address ADDR is stored in the RAM device 205 (in particular, the data becomes a cache line DATAi, and the tag portion TAGp of the address ADDR becomes a corresponding tag word TAGi). Also in this case, more than one access to the RAM device 205 may in general be required.

An important feature of the cache system according to the described embodiment of the present invention consists in the possibility to efficiently fill the memory array 215 of the RAM device 205, minimizing the number of unused RAM locations RLj or portions thereof. This can be achieved due to the great flexibility allowed by the proposed method of filling in the locations in the memory array 215 of the RAM device 205 with tag words and cache lines. In this way, it is possible to reduce the size of the RAM device and to reduce the number of required RAM devices 205, thus saving silicon area and reducing power consumption. Another advantage of said filling flexibility consists in the fact that it is not necessary to design a dedicated RAM device 205 having the exact capacity and the exact dimensions (number of locations and bit width) necessary for storing the desired tag words and the corresponding cache lines in a same, unique RAM location.

Hereinafter, two different examples of implementation for the mapping of tag words TAGi and cache lines DATAi will be illustrated.

Figure 5:
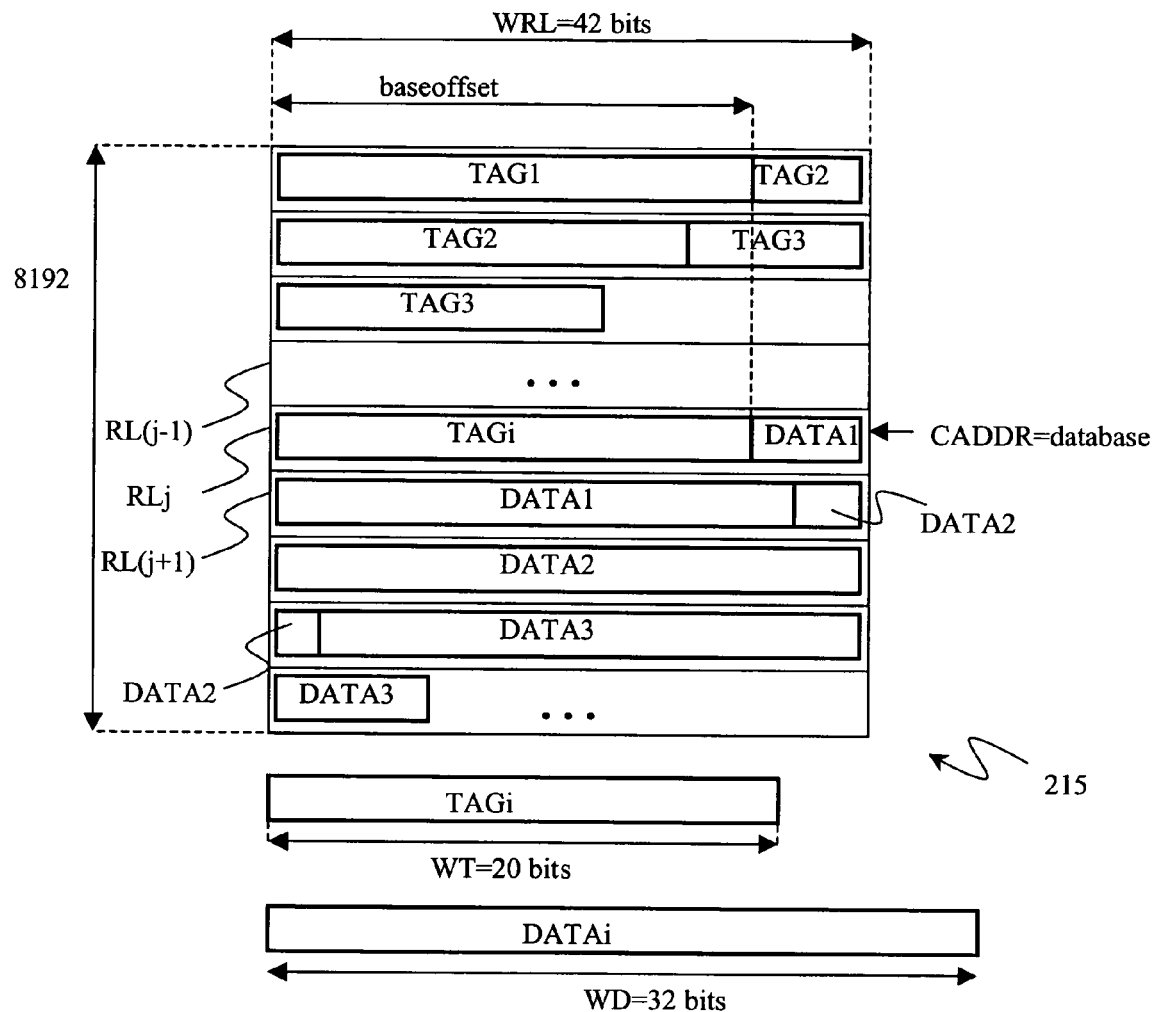
FIG. 5 illustrates tag and cache line mapping on the RAM memory device according to an embodiment of the present invention.

According to a first example, it is assumed that a cache memory system is to be designed including 8192 cache lines DATAi having a bit width WD equal to 32, and having a "block size" equal to 2 (i.e., at each tag corresponds two cache lines). Consequently, 4096 (4K) tag words TAGi will be necessary. Moreover, according to this example, each tag word TAGi has a bit width WT equal to 20. In this case, according to an embodiment of the present invention, a single RAM device 205 is used for storing both the tag words and the cache lines. In particular, the RAM device may include a 8K*42 memory array 215 (i.e., an array with 8192 RAM locations RLj having a bit width WRL equal to 42, as illustrated in FIG. 5). In this way, the RAM device is fully used without any waste of memory space. In fact:

$$8K*42 = 8K*32 + 4K*20 = 8K*32 + 8K*10.$$

A possible implementation of the mapping functions performed by the tag mapping function block Ft and the data mapping function block Fd allows to arrange all the TAG words in a first portion of the array 215 adjacent one to the other, and all the cache lines DATAi are similarly arranged in a second portion of the array 215 adjacent one to another. In particular, the TAG words are, for example, stored in the RAM locations RLj with lowest addresses, starting from the lowest-addresses location. The cache lines DATAi are arranged consecutively and adjacently in the RAM locations RLj with highest addresses, starting from the last location of the array portion dedicated to the tag words. More particularly, the generation of the tag address ADDRtag and of the tag offset value OFFSETtag starting from the address ADDR is accomplished by the tag mapping function block Ft in the following way:

$$ADDRtag=int(((ADDR)a*20)/42)$$

$$OFFSETtag=mod(42,((ADDR)a*20)/42),$$

wherein "20" is the value of the bit width WT of the generic tag word TAGi, and "42" is the value of the bit width WRL of the RAM locations RLi.

The generation of the data address ADDRdata and of the data offset value OFFSETdata starting from the address ADDR is similarly accomplished by the tag mapping function block Fd:

$$ADDRdata=int(((ADDR)a*32)/42)+database$$

$$OFFSETdata=mod(42,mod(42,((ADDR)a*32)/42))+baseoffset,$$

wherein "database" is a value that corresponds to the cache address CADDR of the last RAM locations RLj in the array portion dedicated to the tag words.

In this example, database is equal to "int(4096*20/42)". In addition, "baseoffset" represents the data offset value (OFFSETdata)a of the first cache line (i.e., the one adjacent to the last tag word) within the last RAM location storing a TAG word. In this example, baseoffset is equal to "mod(42, (4095*20/42))+1".

The example just described relates to a 1-way set-associative cache. An N-way set-associative cache can be, for example, realized by using N RAM devices 205 arranged similarly, one RAM device per way.

Figure 6:
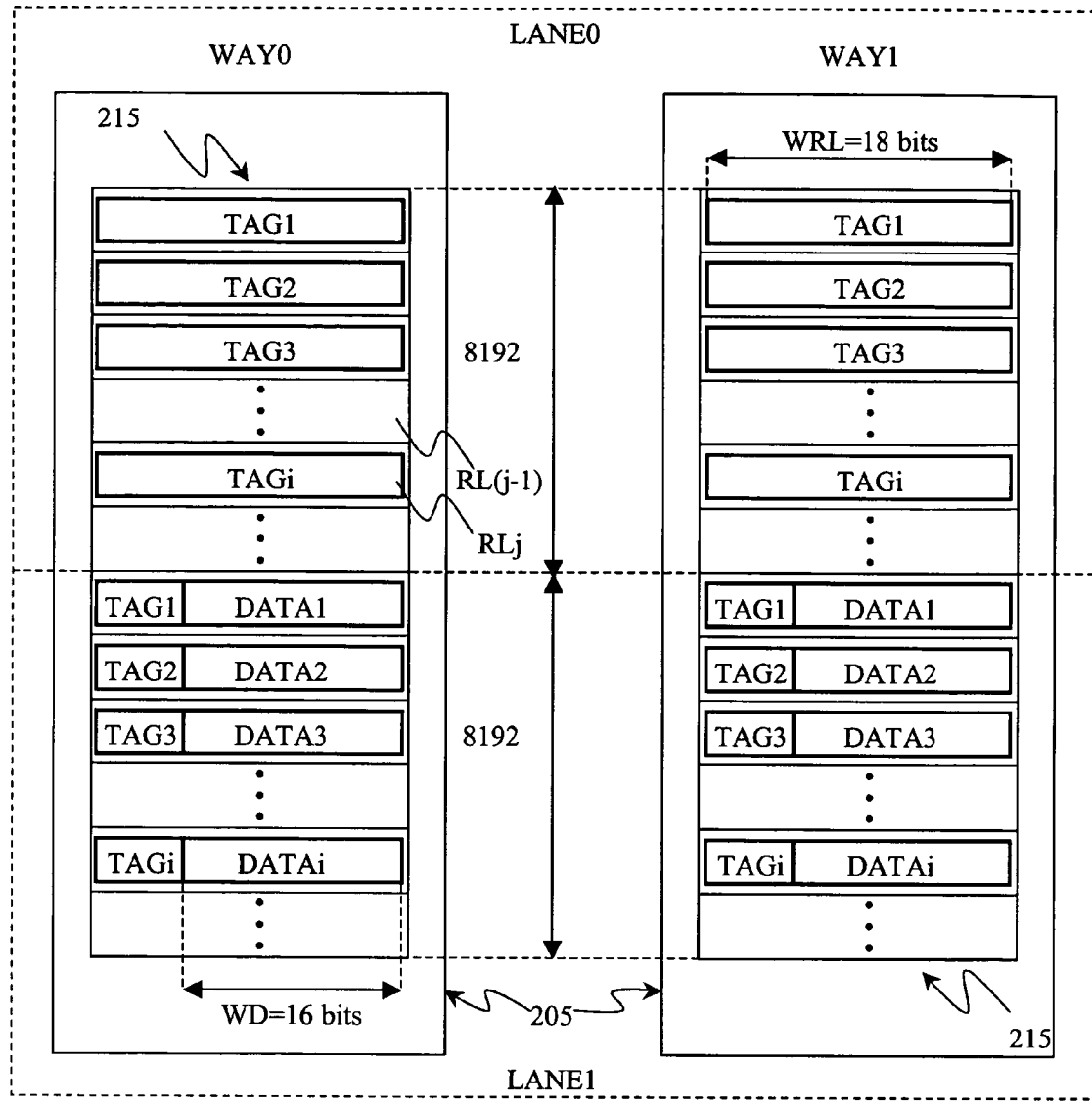
FIG. 6 illustrates tag and cache line mapping on two RAM memory devices according to another embodiment of the present invention.

According to a second example, it is assumed that a cache memory system is to be designed including 8192 cache lines DATAi having a bit width WD equal to 16. In this case, the cache system is assumed to have a block size equal to 1. Consequently, 8192 (8K) tag words TAGi will be necessary. Moreover, according to this example, each tag word TAGi has a bit width WT equal to 20. In this case, a cache memory system may be realized using a single RAM device 205 for storing tag words and cache lines having a 16K*18 memory array 215 (i.e., with 16384 RAM locations RLj having a bit width WRL equal to 18, as illustrated in FIG. 6) per each way. In the example presented in FIG. 6, the number of ways is equal to two. Each way corresponds to a RAM device 205. Considering one of the two ways, for example the way WAY0, the memory array 215 is divided into two different cache zones (or "cache lanes"). A cache zone LANE0 comprises the first 8192 RAM locations RLj corresponding to the cache address interval (CADDR)a=0-(CADDR)a=8191, and a cache zone LANE1 comprises the last 8192 RAM locations RLj corresponding to the cache address interval (CADDR) a=8192-(CADDR)a=16383. Each RAM location RLj belonging to the cache zone LANE0 is paired with a corresponding RAM location RL(j+8192) belonging to the cache zone LANE1 (e.g., their cache addresses CADDR differ in the most significant bit). Each RAM location RLj belonging to the cache zone LANE0 stores a chunk of tag word TAGi corresponding to the 18 least significant bits thereof. The corresponding RAM location RL(j+8192) belonging to the cache zone LANE1 includes the second chunk of the tag word TAGi comprising the remaining two most significant bits, while the residual 16 bits store a corresponding cache line DATAi. According to this particular mapping, it is possible to speed up the operations performed by the cache memory system 115. Particularly, a cache miss can be decreed in a reduced time. In fact, the tag comparison operation executed by the comparator block 245 is first executed on the 18 least significant bits of the tag word TAGi chunk retrieved by performing a first access to the RAM device 205. If said 18 least significant bits of the tag word TAGi result different from the 18 least significant bits of the tag portion TAGp of the address ADDR, a cache miss is decreed without the need of retrieving the remaining chunk of the TAG word. Otherwise, the cache memory system 115 operates a second access on the corresponding RAM location in the cache zone LANE1 (simply inverting the most significant bit of the cache addresses) for obtaining the remaining two bits of the second chunk of the tag word TAGi. At this point, the comparator block 245 compares said second chunk with the two most significant bits of the tag portion TAGp of the address ADDR. In case of a cache hit, the corresponding cache line DATAi, already read out from the memory, is exploited. Due to this particular access policy, the switching activity of the address lines of the RAM memory device 205 is reduced, implying a reduced power consumption. In fact, the cache addresses CADDR of RAM locations corresponding to the two different cache zones LANE0, LANE1 and storing chunks of the same tag word TAGi differ only by the most significant bit.

In addition to the two examples described hereinbefore, the concepts of the present invention can be applied also in different cases.

Figure 7:
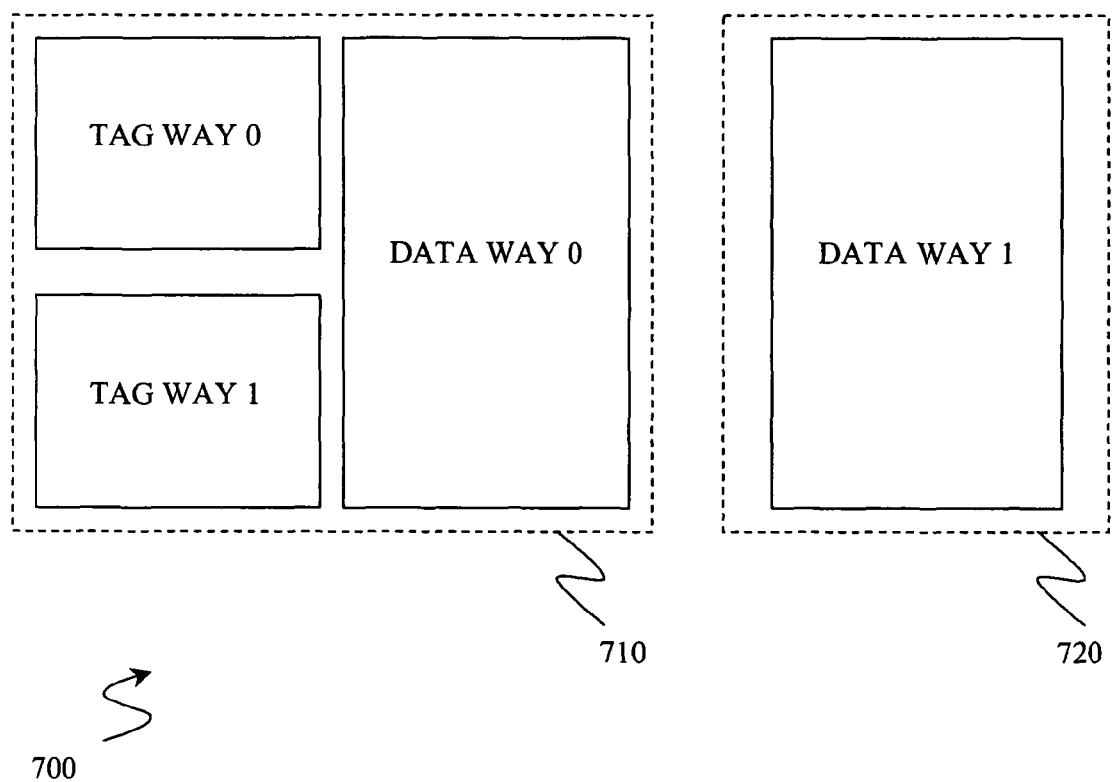
FIG. 7 illustrates tag and cache line mapping on two RAM memory devices according to still another embodiment of the present invention.

For example, referring to FIG. 7, a two-way cache memory system 700 having a block size equal to 2 may be conveniently implemented storing the tag words of the two ways (TAG WAY 0, TAG WAY 1) together with the cache lines of a way (DATA WAY 0) in a single memory device 710 without wasting memory space. The cache lines of the other way (DATA WAY 0) may be stored in a further memory device 720. Generalizing, in the case in which the block size value is identical to the number of ways, an advantageous cache mapping architecture may be obtained storing into a single memory device the tag words of all the ways together with the cache lines of a way.

It should be noted that in all the cases illustrated hereinbefore, it is possible to store in the RAM device an additional bit per each tag word TAGi, used as a flag bit indicating if the corresponding word is a proper tag word TAGi instead of an unused word including random bits.

Moreover, the concepts of the present invention remain applicable in case some or all the operations performed by the functional blocks hereinabove described are performed by means of software/firmware tools, e.g., if part or all of said functional blocks (like for example the address value incrementer/decrementer 225, the shifters 230, 235, and so on) are implemented in terms of instructions executed by a suitable-programmed, e.g. embedded micro controller.

Referring to FIGS. 1-7, the cache memory system may be part of a larger system, such as a computer system.

From the foregoing it will be appreciated that, although specific embodiments of the invention have been described herein for purposes of illustration, various modifications may be made without deviating from the spirit and scope of the invention.

The invention claimed is:

1. A cache memory system, comprising a cache memory and a cache memory controller, wherein:
   the cache memory includes a plurality of storage locations, each storage location identified by a particular corresponding cache address and each storage location operable to store tag address portions during a first operation and data words during a second operation that is not simultaneous to the first operation, each data word corresponding to a respective tag address portion and wherein the tag address portion is different than the cache address;
   the cache memory controller is adapted to receive a first address and to access the cache memory based on the received first address,
   wherein the cache memory controller includes:
      a first address transformer adapted to receive the first address and to transform it into a first cache address corresponding thereto by applying a first transform function, the first cache address being used by the cache memory controller for accessing the cache memory to retrieve at least a first part of a tag address portion stored in at least one of the storage locations;
      a hit detector adapted to establish an at least partial hit condition based on a comparison of the retrieved at least a first part of the tag address portion and a first predetermined part of the first address, and
      a second address transformer adapted to receive the first address and to transform it into at least one second cache address corresponding thereto by applying a second transform function,
   the cache memory controller being further adapted to use the at least one second cache address for accessing the cache memory to retrieve a data word corresponding to the retrieved tag address portion in case said at least partial hit condition is established.

2. The cache memory system of claim 1, wherein the cache memory controller is adapted to use the at least one second cache address for accessing the cache memory to retrieve a second part of the tag address portion, the hit detector being adapted to establish a cache hit condition based on a comparison of the retrieved second part of the tag address portion and a second predetermined part of the first address.

3. The cache system of claim 2, wherein the first address transformer is adapted to transform the first address into at least two first cache addresses, each one of the at least two first cache addresses corresponding to a respective storage location containing a respective fraction of said tag address portion.

4. The cache system of claim 2, wherein the second address transformer is adapted to transform the first address into at least two second cache addresses, each one of the at least two second cache addresses corresponding to a respective storage location containing a respective fraction of said data word.

5. A cache memory system, comprising a cache memory and a cache memory controller, wherein:
   the cache memory includes a plurality of storage locations, each storage location identified by a particular corresponding cache address and each storage location operable to store tag address portions and data words, each data word corresponding to a respective tag address portion and wherein the tag address portion is different than the cache address;
   the cache memory controller is adapted to receive a first address and to access the cache memory based on the received first address,
   wherein the cache memory controller includes:
      a first address transformer adapted to receive the first address and to transform it into a first cache address corresponding thereto by applying a first transform function, the first cache address being used by the cache memory controller for accessing the cache memory to retrieve at least a first part of a tag address portion stored in at least one of the storage locations;
      a hit detector adapted to establish an at least partial hit condition based on a comparison of the retrieved at least a first part of the tag address portion and a first predetermined part of the first address, and
      a second address transformer adapted to receive the first address and to transform it into at least one second cache address corresponding thereto by applying a second transform function,
   the cache memory controller being further adapted to use the at least one second cache address for accessing the cache memory to retrieve a data word corresponding to the retrieved tag address portion in case said at least partial hit condition is established; and
   wherein the cache controller further includes first means for extrapolating the at least a first or second part of a tag address portion in response to said accessing the cache memory using the at least one first or second cache address.

6. The cache system of claim 5, wherein said first address transformer is further adapted to derive from said first address a tag offset indication, exploited by said first means for extrapolating the at least first or second part of a tag address portion.

7. The cache system of claim 6, wherein the cache controller further includes second means for extrapolating the data word from a result of said accessing the cache memory using the at least one second cache address.

8. The cache system of claim 7, wherein said second address transformer is further adapted to derive from said first address a data offset indication, exploited by said second means for extrapolating data word.

9. The cache system of claim 8, wherein said first address transformer includes:
   a first address converter, adapted to generate a first transformed address and the tag offset indication; and
   a cache address generator adapted to generate the at least one first cache address based on said first transformed address.

10. The cache system of claim 9, wherein said second address transformer includes:
    a second address converter, adapted to generate a second transformed address and the data offset indication; and
    a cache address generator adapted to generate the at least one second cache address based on said second transformed address.

11. The cache system of claim 2, further including input means adapted to:
    receive tag address portions and data words;
    generate respective fractions of tag address portion in response to a received tag address portion, according to the at least first or second part of tag address portion and to the tag offset indication; and
    generate respective fractions of data word in response to a received data word, according to the at least one second cache address and to the data offset indication.

12. A caching method including:
    providing a cache memory and a cache memory controller, the cache memory including a plurality of storage locations, each storage location identified by a particular corresponding cache address and each storage location being operable to store tag address portions in a first operation and data words in a second operation, each data word corresponding to a respective tag address portion;

the cache memory controller receiving a first address and accessing the cache memory based on the received first address, said caching method comprising:
- transforming the first address into at least one first cache address that is different from the tag address corresponding thereto by applying a first transform function;
- using the at least one first cache address for accessing the cache memory;
- retrieving from the cache memory at least a first part of a tag address portion stored in at least one of the storage locations;
- establishing an at least partial hit condition basing on a comparison of the retrieved at least first part of the tag address;
- transforming the first address into at least one second cache address corresponding thereto by applying a second transform function;
- in case said at least partial hit condition is established, using the at least one second cache address for accessing the cache memory to retrieve a data word corresponding to the retrieved tag address portion.

13. A data processing system, comprising:
a data processor;
a main memory operatively associated with said data processor for sharing data; and
a cache memory system operatively associated with the data processor and the main memory, the cache memory system including a cache memory and a cache memory controller, wherein
the cache memory includes a plurality of storage locations, each storage location identified by a particular corresponding cache address and each storage location operable to be configured in a first manner to store tag address portions that are different from any cache address and operable to be configured in a second manner to store data words, each data word corresponding to a respective tag address portion,
the cache memory controller is adapted to receive a first address and to access the cache memory based on the received first address, and
the cache memory controller includes
a first address transformer adapted to receive the first address and to transform it into a first cache address corresponding thereto by applying a first transform function, the first cache address being used by the cache memory controller for accessing the cache memory to retrieve at least a first part of a tag address portion stored in at least one of the storage locations,
a hit detector adapted to establish an at least partial hit condition based on a comparison of the retrieved at least a first part of the tag address portion and a first predetermined part of the first address, and
a second address transformer adapted to receive the first address and to transform it into at least one second cache address corresponding thereto by applying a second transform function,
the cache memory controller being further operable to use the at least one second cache address for accessing the cache memory to retrieve a data word corresponding to the retrieved tag address portion in case said at least partial hit condition is established.

14. A unified cache memory, the cache memory including a plurality of storage locations, each storage location being identified by a corresponding cache address and operable to store tag address portions at a first instance and to store data words at a second instance, each data word corresponding to a respective tag address; wherein the cache memory further includes an asymmetric logic mapping of tag address portions and data words.

15. A cache memory system, comprising a unified cache memory and a cache memory controller, wherein:
the cache memory includes a plurality of storage locations, each storage location identified by a corresponding cache address and operable to store both tag address portions and data words depending on an operating instruction in an asymmetric logic mapping, each data word corresponding to a respective tag address; and
the cache memory controller is operable to receive a first address and to access the cache memory based on the received first address.

16. A caching method, comprising:
providing a unified cache memory and a cache memory controller, the cache memory including a plurality of storage locations, each storage location identified by a corresponding cache address
configuring a first storage location to store tag address portions and configuring a second storage location to store data words in an asymmetric logic mapping, each data word corresponding to a respective tag address;
receiving a first address with the cache memory controller;
accessing the cache memory based on the received first address
reconfiguring the second storage location to store tag address portions and reconfiguring a first storage location to store data words in an asymmetric logic mapping, each data word corresponding to a respective tag address;
receiving a first address with the cache memory controller; and
accessing the cache memory based on the received first address.

17. A data processing system, comprising:
a data processor;
a main memory operatively associated with said data processor for sharing data; and
a cache memory system operatively associated with the data processor and the main memory, the cache memory system including a unified cache memory and a cache memory controller, wherein
the cache memory includes a plurality of storage locations, each storage location identified by a corresponding cache address and operable to store both tag address portions and data words in an asymmetric logic mapping depending on an instruction received at the cache memory, each data word corresponding to a respective tag address,
the cache memory controller is adapted to receive a first address and to access the cache memory based on the received first address.

* * * * *